United States Patent
Watson et al.

[11] Patent Number: 6,038,979
[45] Date of Patent: Mar. 21, 2000

[54] INSENSITIVE WARHEAD CASINGS

[75] Inventors: Fred W. Watson, Montross; Wayne Hannock, King George; Robert Lam, Spotysylvania; George Evans, Woodford, all of Va.

[73] Assignee: The United States of America as represented by the Secretary of the Navy, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/888,383

[22] Filed: Jul. 7, 1997

Related U.S. Application Data

[62] Division of application No. 08/721,308, Jun. 30, 1996, Defensive Publication No.H1779.

[51] Int. Cl.[7] .............................. F42B 39/14; F42B 12/20
[52] U.S. Cl. .......................... 102/481; 102/473; 60/39.1; 60/253
[58] Field of Search ..................................... 102/473, 481, 102/491, 493; 60/39.1, 253, 223

[56] References Cited

U.S. PATENT DOCUMENTS

| | | | |
|---|---|---|---|
| H1367 | 11/1994 | Allen, Jr. et al. . | |
| 2,751,237 | 6/1956 | Conley | 156/173 |
| 2,872,865 | 10/1959 | Skaar | 102/473 |
| 3,173,364 | 3/1965 | Nordzell | 102/481 |
| 3,194,158 | 7/1965 | Paul, Jr. | 102/473 |
| 3,879,243 | 4/1975 | Medney | 156/155 |
| 4,646,615 | 3/1987 | Gladstone et al. | 89/15 |
| 4,746,393 | 5/1988 | Ephere et al. | 156/175 |
| 4,781,117 | 11/1988 | Garnett et al. | 102/493 |
| 4,838,166 | 6/1989 | Spies et al. . | |
| 5,035,180 | 7/1991 | Purcell et al. . | |
| 5,035,181 | 7/1991 | Jacks et al. . | |
| 5,035,182 | 7/1991 | Purcell et al. . | |
| 5,060,470 | 10/1991 | Van Name | 102/481 |
| 5,129,326 | 7/1992 | Brogan . | |
| 5,155,298 | 10/1992 | Koontz . | |
| 5,170,007 | 12/1992 | Figge, Sr. | 102/481 |
| 5,228,285 | 7/1993 | Van Name et al. . | |
| 5,311,820 | 5/1994 | Ellingsen . | |
| 5,361,703 | 11/1994 | Braithwaite . | |
| 5,369,955 | 12/1994 | Van Name et al. | 102/481 |
| 5,376,200 | 12/1994 | Hall | 156/173 |

*Primary Examiner*—Harold J. Tudor
*Attorney, Agent, or Firm*—James B. Bechtel, Esq.

[57] ABSTRACT

The present invention is a process and material for forming warhead casings. The material itself consists of tightly wound carbon fiber bonded by a low temperature (room temperature) resin. This process of formation gives several advantages, including the ease of manufacturing and the elimination of the need to do inside threading as the interior of the casing can be totally formed during winding of the carbon thread. This also increases the speed of the formation process. The use of carbon thread and low temperature resins also gives several key advantages. First, the low temperature aspect of the resin allows the resulting casing to break down at temperatures significantly less than the ignition point of the munitions held within it. Because the fibers tend to separate as the ambient temperature increases, the casing will auto-ventilate at high temperatures. Additionally, since the casing is formed from carbon fibers, it maintains a high tensile strength while minimizing the weight of the casing.

1 Claim, 3 Drawing Sheets

INSENSITIVE WARHEAD CASINGS

This is a divisional of application Ser. No. 08/721,308 filed on Jun. 30, 1996, now U.S. Statutory Invention Registration H1779.

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention is related to the ammunitions and explosives field and in particular to insensitive munitions.

BACKGROUND OF THE INVENTION

Ammunition casings, formed from hardened materials, generally stainless steel, have met many of the needs of modern warfare, while failing to meet others. The choice of stainless steel has yielded casings which have a great deal of strength and have been able to withstand the rigors of combat. However, at the same time, stainless steel, as a metal, has several disadvantages.

The main disadvantage of the use of stainless steel casings has been in the reaction of the encased ammunition to heating, including fires within ammunition storage areas. With a hardened shell having a melting point higher than the ignition temperature of the enclosed ammunition, stainless steel casings contain the expanding gases created during ammunition cook-off. When the pressure of the expanding gases is great enough, the casing ruptures explosively, generating explosion damage and metal fragments. In order to preclude a chain reaction of stored munitions, land-based ammunition dumps are typically divided into a series of bunkers separated by sufficient distance to isolate one bunker from another. This type of isolation is not available for shipboard ammunition storage due to the limited available space and due to the proximity of other flammable or explosive materials including fuels, oxygen, high voltage electrical circuits and the like.

Additionally, because of the hardened nature of the stainless steel casings, all machining must be performed after the initial molding of the casing. This means that the interior of a hollow cylindrical casing must be machined using special tools. This process is lengthy and slows the time of manufacture for casings. Finally, although hardened materials, such as stainless steel, provide high tensile strength, this strength comes at the cost of weight. The weight of the casing can affect the ease of transportation of the ammunition itself and the flight characteristics of encased missile weapons.

Numerous other prior art technologies have addressed the problems of munition cook-off on shipboard. For example, U.S. Pat. No. 4,991,513 describes a means for providing vent holes in munition casing using a twisting mechanism to open or close the holes (analogous to opening and closing a salt or pepper shaker). Each of these prior technologies has resulted in further disadvantages, increased weight, poor sealing of the casing, increased complexity requiring operator action to ready the munition, increased cost and other disadvantages. What is desired is a munition casing having increased strength, lower weight, less cost, while still retaining the insensitive characteristics when subjected to high temperatures or fire.

SUMMARY OF THE INVENTION

It is an object of this invention to provide a casing material capable of breaking down at temperatures less than the ignition point of common explosives.

It is another object of the invention to provide a material which loses structural integrity at high temperatures such that any burning gases within the casing can be safely vented.

It is yet another object of the invention to provide a material which has both a high tensile strength and a low weight.

It is still another object of the invention to provide a process for forming warhead casings from this material which is faster, more efficient and less costly than previous manufacturing processes.

Accordingly, the invention is a carbon fiber-resin munition casing and a process for forming casings through fiber winding which allows the interior of the casing to be formed during casing construction.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
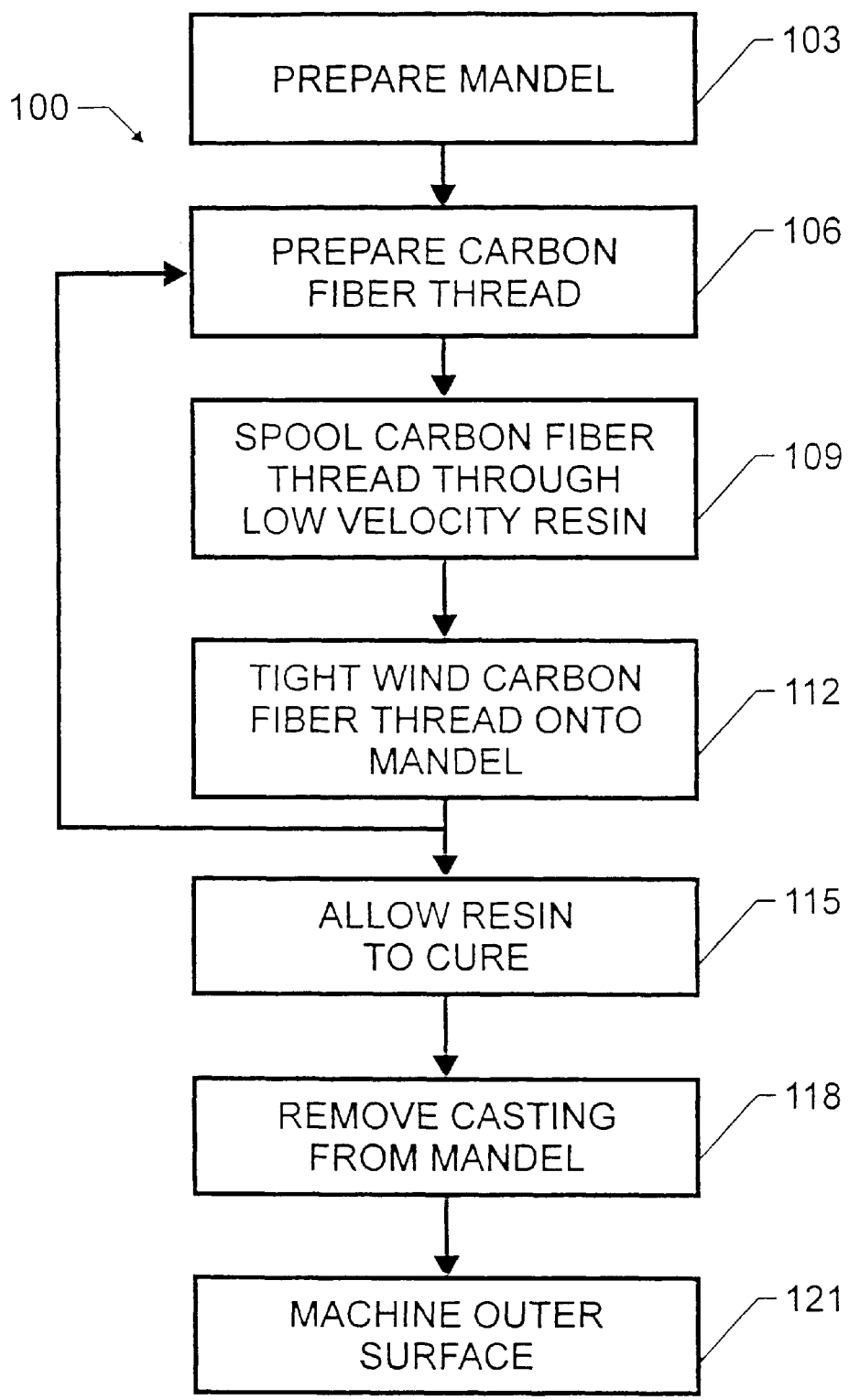
FIG. 1 is a flowchart of the manufacturing process.

Referring now to FIG. 1, the process for manufacturing the casing material, designated generally by the reference numeral 100, is shown with its major steps. In step 103, the mandrel is prepared to accept the spooled carbon fiber. In the present invention, the mandrel acts as a mold, and the exterior shape of the mandrel determines the interior shape of the resulting casing.

In step 106, the carbon fiber thread is prepared. In the preferred embodiment, dual strands with a high filament content were found to provide best results; however, the number of strands wound at once could be changed to suit the specific end product desired. The filament content determines the strength of the resulting material. For high tensile strength applications, including warhead casings, high filament content carbon fibers yield better results.

The prepared carbon thread from step 106 is passed through a low viscosity resin in step 109. The type of resin selected will determine the glass transition temperature of the resulting casing. It is important that the ignition temperature of the materials enclosed by the casing exceed the glass transition temperature of the resin. Additionally, the resin cures at room temperature, thus minimizing the need for special curing procedures. The resin after curing has a glass transition temperature less than 250 degrees Fahrenheit.

Once the carbon fiber thread has been coated with resin in step 109, it is tightly wound about the mandrel in step 112. The thread must be tightly wound about the mandrel in order to provide strength and the ability to hold the shape of the mandrel after the completion of the manufacturing process. In order to maintain structural integrity of the resulting casing, it is important that the fiber be wound as a continuous thread. Breaking the thread jeopardizes the integrity of the casing formed through the process.

Figure 3:
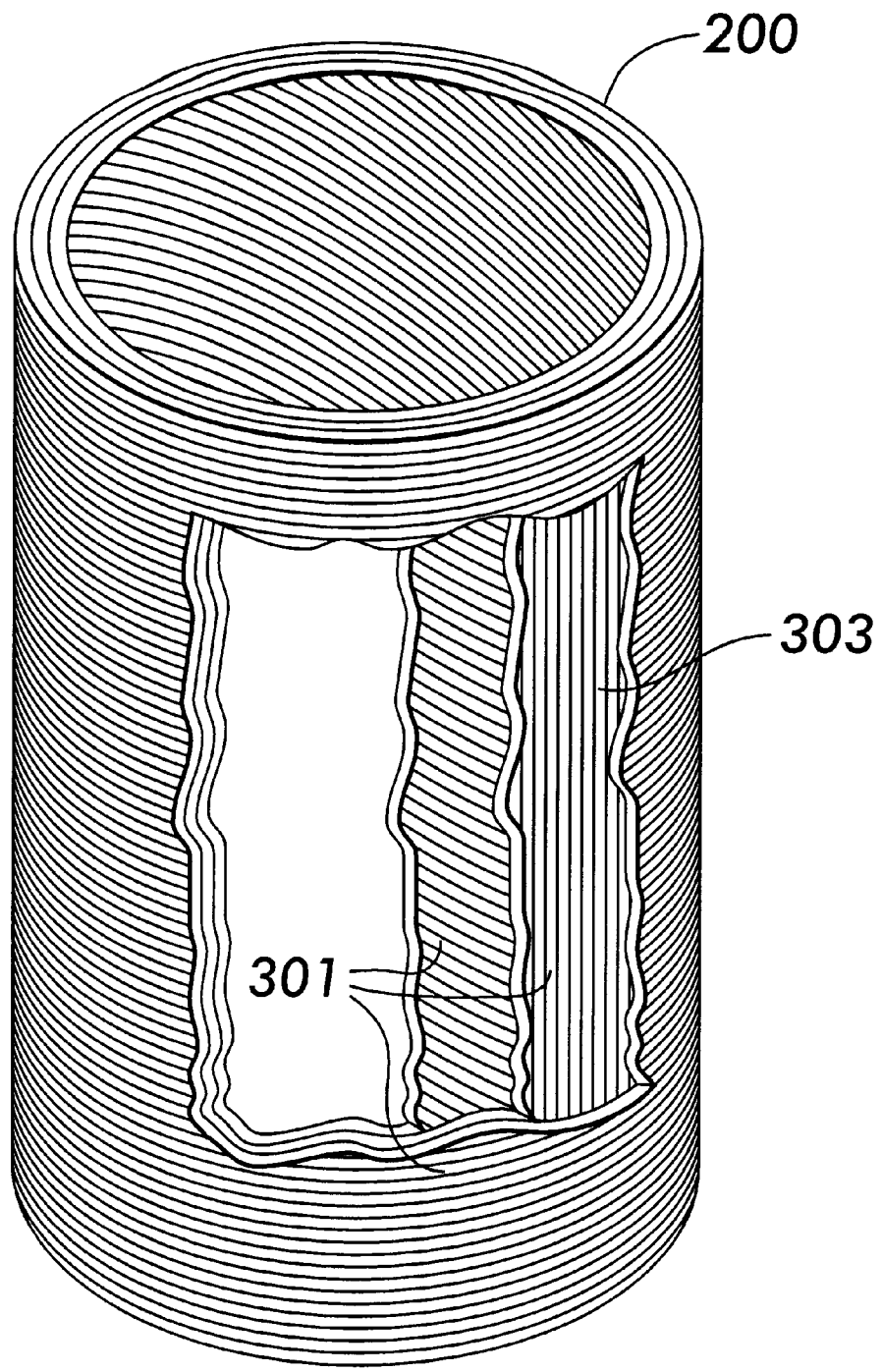
FIG. 3 is a perspective view of the casing showing winding layers.

The entire process between steps 106 and 112 may be completed one or more additional times to provide higher tensile strength to the resulting casing. Referring to FIG. 3, the preferred embodiment shows three separate layers 301 of carbon fiber were used, with the second layer 303 longitudinally, in order to provide tensile strengths exceeding 3000 psi.

Once the winding steps 106, 109, and 112 have been completed as many times as desired, the completed mold must be allowed to cure and harden in step 115.

The resulting hardened casing is removed from the mandrel during step 118, yielding a finished product. Because the shape of the mandrel can be used to form all inner surfaces including making screw threads, no additional processing is required on the inner surfaces. The outer surfaces of the casing are machined if necessary in step 121, thus yielding a completed finished casing.

This novel method of manufacture allows the winding process to include the functions of internal machining which results in more accurate internal dimensions, faster manufacturing times, and more efficient use of materials. Since the manufacturing process is faster and less complex, manufacturing costs are reduced.

Figure 2:
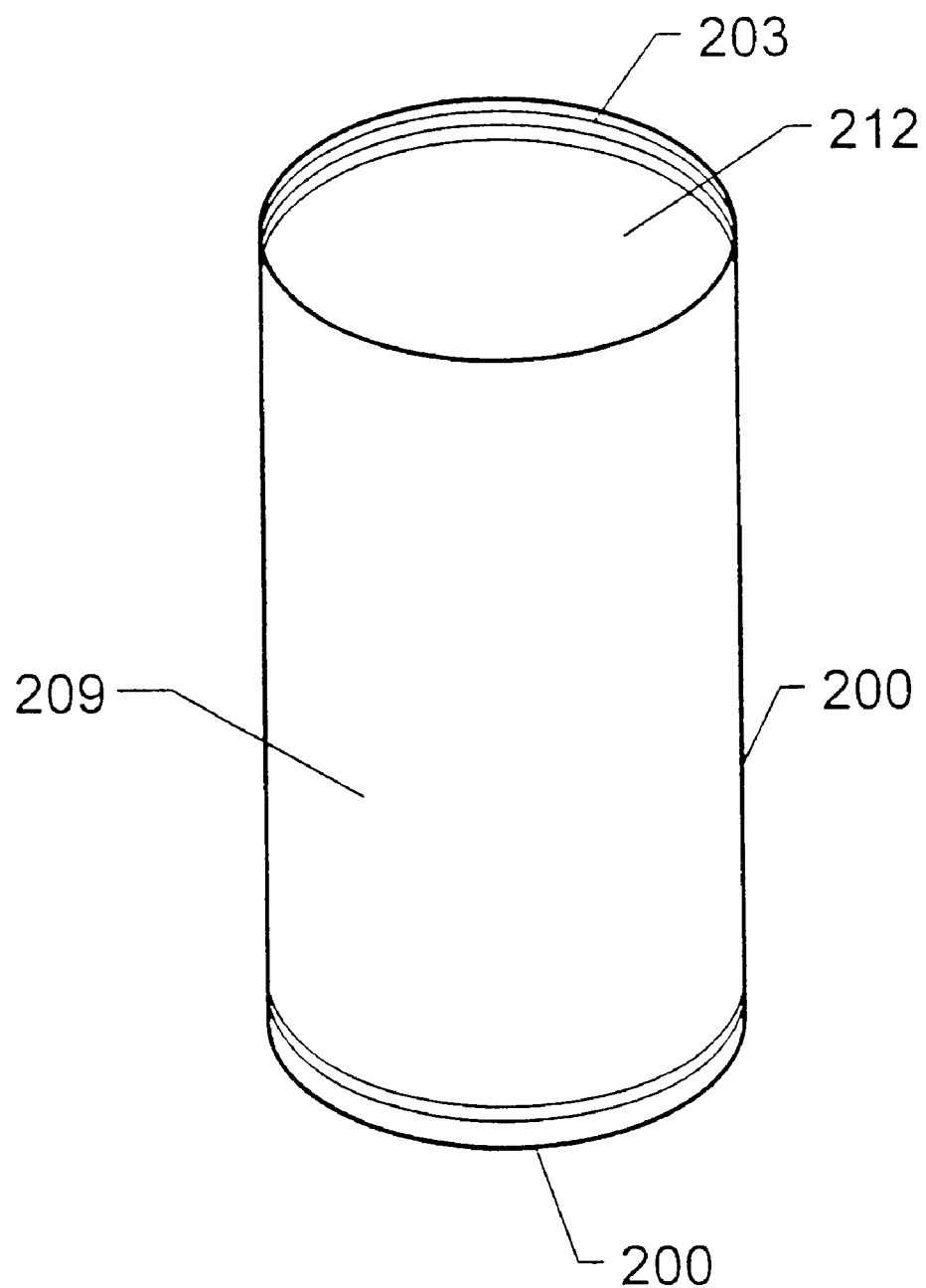
FIG. 2 is a depiction of a warhead casing made from the material of the present invention.

An example of the resulting casing is shown in FIG. 2. Casing 200 is a hollow cylindrical tube approximately six inches in length. Inner surface 212 and outer surface 209 of casing 200 are smooth as a result of the winding and machining process. The thickness of the wall of casing 200 is approximately 1.5 millimeters. Interior screw threads 203 are formed during the winding process. External threads 206 are formed by machining the resulting casing after winding. This particular example, the preferred embodiment of the present invention, combines tensile strengths exceeding 3000 psi with glass transition and resin breakdown temperatures under 250 degrees Fahrenheit.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. An insensitive warhead casing for containing an explosive comprising a hollow cylindrical casing having a plurality of tightly-wound resin-coated continuous carbon fiber threads and having molded interior screw threads adjacent one end, said plurality of tightly-wound resin-coated continuous carbon fiber threads further comprise a first layer forming an interior surface of said hollow cylindrical casing and containing said molded interior screw threads therein, a second layer wound longitudinally over said first layer, and a third layer wound over said second layer, said resin-coated carbon fiber threads having a glass transition temperature of less than 250 degrees Fahrenheit.

* * * * *

UNITED STATES PATENT AND TRADEMARK OFFICE
CERTIFICATE OF CORRECTION

PATENT NO. : 6,038,979
DATED : March 21, 2000
INVENTOR(S) : Fred W. Watson et al.

It is certified that error appears in the above-identified patent and that said Letters Patent is hereby corrected as shown below:

On the title page item :

should read--

[75] Inventors: Fred W. Watson, Montross;
Wayne Hannock, King George; Robert Lam, Spotsylvania; George Evans, Woodford, all of Va.

Signed and Sealed this

Sixth Day of February, 2001

Attest:

Q. TODD DICKINSON

*Attesting Officer*  *Director of Patents and Trademarks*